INVENTOR.
LILLIAN O. McEWEN,
HAROLD W. ULMER
BY
Angus & Mon
ATTORNEYS.

INVENTOR.
LILLIAN O. McEWEN,
HAROLD W. ULMER
BY
Angus & Mon
ATTORNEYS.

INVENTOR.
LILLIAN O. McEWEN,
HAROLD W. ULMER
BY
ATTORNEYS.

3,381,092

AUTOMATIC TELEPHONE ALARM SYSTEM WITH PARTICULAR HOOK SWITCH PULSER ARRANGEMENT

Lillian O. McEwen, 1738 Kurtz St., and Harold W. Ulmer, 306 N. Clementine St., both of Oceanside, Calif. 92054

Filed June 18, 1964, Ser. No. 376,005
7 Claims. (Cl. 179—5)

ABSTRACT OF THE DISCLOSURE

This invention relates to an alarm which is set off by a sensor that detects an intrusion or other variation from a normal condition. A telephone installation is included which has a dialing circuit. The dialing circuit is actuated to dial a predetermined number when a variation is detected, after which a recorded message is delivered, advising the intended recipient of the variation.

This invention relates to an alarm.

Alarms which are provided for the purpose of monitoring the condition of some region or condition in a region are well known. Perhaps the best known are those which are commonly called "burglar alarms." In these, some act not common to the safe condition of a region actuates a circuit, such as by opening a switch on a door or window, by interrupting an energy beam, by generation and reception of sound signals, or even by disturbing a trip wire. Actuation of the circuit in turn sets off a visible or audible alarm. Such alarms have the disadvantage that they merely turn on a bell or actuate a signal at a central station which indicates either to passersby or monitors that some unspecified event has occurred. Inherent in this situation is uncertainty which causes unnecessary investigations and redundant responses. These alarms are unable to communicate more than the fact that an event has happened and do not necessarily lead the law enforcement or fire control agencies to the specific location where trouble has developed, nor necessarily with specific facilities to handle it.

It is an additional objection to the aforementioned arrangements that it is necessary either to broadcast the event to passersby in general in the hope that one of them will contact the authorities (or be in authority), or to subscribe to control station organizations who agree to investigate every alarm.

It obviously would be advantageous were a business or other operation able to utilize its standard telephone circuits to contact a wide and randomly selected group of responsible agencies in response to alarms, which agencies would not have to enter into a specific contract. Examples of such agencies are managers of the business concerned, neighbors, and police departments and fire departments. However, such an alarm obviously cannot be a coded alarm or a mere bell signal for it then would not provide, except by undesirable pre-arrangement, a signal recognizable by these persons or agencies as representing an untoward occurrence. Therefore, an objective of this invention is to provide a device able to be combined with the standard telephone circuit (which is subscribed to by every business) with a reliable alarm which is able to dial a telephone number as required as a function of data supplied in the machine, and then as a further function to provide a recorded message relating to a specific event which occurred when a sensor provided the signal that an event had taken place against which the alarm is to guard.

An alarm device according to this invention is adapted to be used in combination with a telephone of the class which includes a base, a microphone, and a hook switch which is adapted to produce line pulses of dialing type. The alarm device itself comprises a hook switch pulser that is adapted to bear against and actuate the hook switch to produce dialing pulses. The pulser does not require any attachments or modifications to the telephone itself. It merely provides a force exerted between the base and the hook switch to pulse the hook switch. Furthermore, it is adaptable to all types of dial telephones.

Pulser-actuating means is provided to actuate this hook switch pulser. Pulse-data bearing means bear a code relating to a number to be dialed, and data-responsive means is adapted to actuate the pulser-actuating means, thereby to pulse the hook switch and dial a telephone number. Message-data bearing means and message-reproducing means, including a speaker, is adapted to supply a reproduced message to the telephone microphone after the pulser has dialed the number. A sensor that is adapted to be placed in a location whose condition is to be monitored by the alarm device is interconnected to the data-responsive means and to the message-reproducing means so as to initiate their operation, the result of which is to dial a number, and then supply a recorded message to the telephone microphone as a function of the occurrence of an event against which the alarm is set to guard.

The above and other features of this invention will be fully understood from the following detailed description and the accompanying drawing in which.

Figures 1, 3:
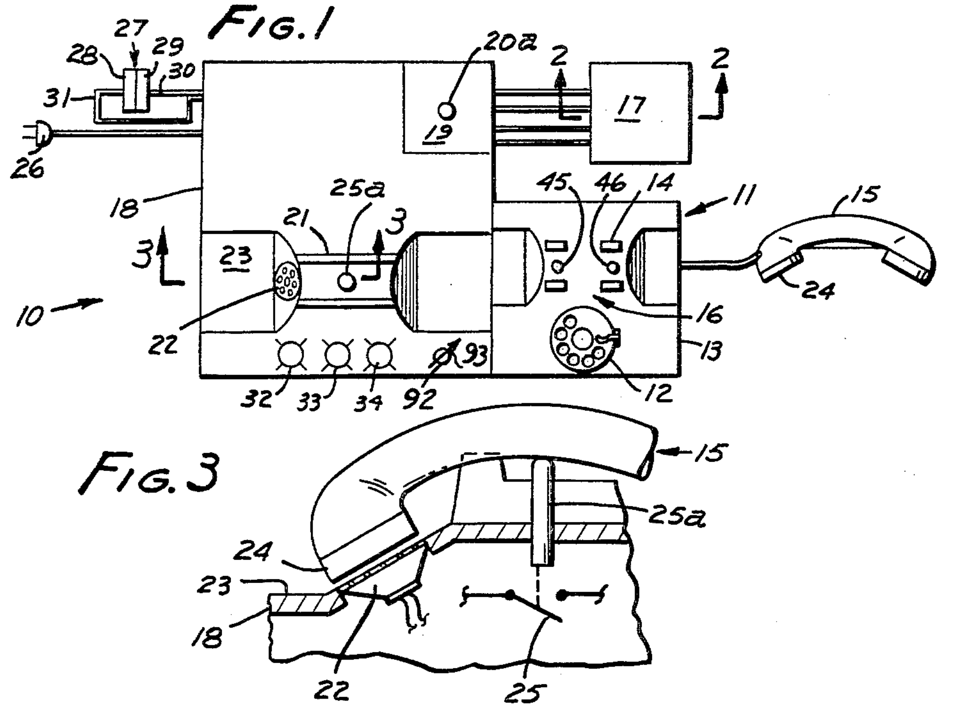
FIG. 1 is a plan view of the presently preferred embodiment of the invention.
FIG. 3 is a fragmentary cross-section taken at line 3—3 of FIG. 1.

FIG. 1 illustrates the presently preferred embodiment of alarm device 10 according to the invention. This device is intended to be used in combination with a telephone set such as a desk set 11. This telephone set has the common dial 12 and base 13. Posts 14 are provided to hold a hand set 15 in position over the hook switch 16. The device is equally useful with wall phones and the like, the desk set being shown as the most commonly encountered example in industrial usage.

As is well known in the telephone art, dialing pulses are produced by rotation of the dial. It is equally well known that pulsing the hook switch (by depressing and releasing it at a proper rate), will produce dialing pulses the same as the dial would, and that it is possible to dial a number by appropriately pulsing the hook switch. A hook switch pulser 17 is provided for the purpose of depressing and releasing the hook switch, thereby to provide a pulsing operation of the hook switch so as to dial a selected number.

The alarm device base 18 includes a surface 19 where the hook switch pulser is placed when it is not in use on the telephone set. A check switch 20 is placed beneath surface 19 and a post 20*a* rises above surface 19 so it is depressed when the hook switch pulser is placed upon surface 19. Check switch 20 thereby changes its conductive condition when the hook switch pulser is taken off of or placed upon surface 19.

Base 18 also has a hand set support 21 upon which the hand set is adapted to be rested in the manner shown in FIG. 3. A speaker 22 is placed adjacent to a depression 23 adjacent to the microphone 24 of hand set when in the condition shown in FIG. 3. When the hand set is in this condition, it bears against the actuator post 25*a* of a switch 25, so that the telephone may be answered when the hook switch pulser is still in place. When the telephone hand set is raised off of its rest position, switch 25 allows power to flow to a portion of the hook switch pulser thereby actuating the telephone circuit or giving dial tone.

A power plug 26 connects with circuitry yet to be described and is typically adapted to be plugged into a 117 volt A.C. power source in order to power the device.

A sensor 27 is shown in FIG. 1 as a pair of conductive plates 28, 29 which, when they are pressed against each other, permits current to flow through leads 30, 31. It is the function of the device as illustrated to indicate whether or not plates 28 and 29 are in surface contiguity. A typical use for this device would be to place one of the plates on a door and the other on the door jamb, so that when the door is opened, the circuit is broken between the plates, thereby initiating the operation of the device by indicating a condition being monitored. The condition being monitored in this example is whether a door or window which should be closed, is opened after the time when the alarm device was placed in operation. It is evident that alternate types of sensors may be utilized such as light beams or infra-red beams, and that they may be placed in other locations such as windows, aisles and the like. It is important only to note that this sensor is sensitive to the maintenance of a conductivity across leads 30 and 31 and that the type of sensor which produces it is of no importance to the instant invention. Piloting circuits could as well be used which would open a switch between leads 30 and 31, to be responsive to other types of signals. Still another technique would be to use a conductive link of low melting-point material connected between leads 30 and 31, the melting of which would break the circuit and actuate the alarm. Then one of the voice messages would normally state the presence and location of a fire.

Indicator lights 32, 33, 34 are provided in the base to indicate conditions in the circuitry, as will later be described.

Figure 2:
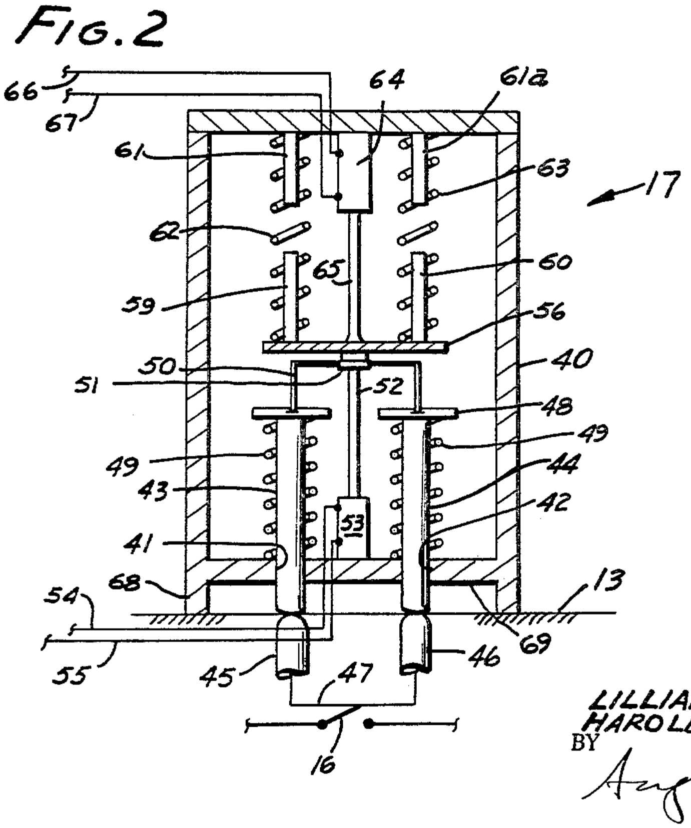
FIG. 2 is a cross-section taken at line 2—2 of FIG. 1.

The hook switch pulser 17 is shown in full detail in FIG. 2. It includes a frame 40 with a pair of holes 41, 42 in the bottom thereof which are adapted to register with hook switch 16. Hook switch 16 is indicated as a pair of plungers which will be recognized as the plungers which are part of the telephone set and which make ultimate contact with the electrical circuitry of the telephone itself. The details of the hook switch are not shown, these being of no particular importance to the invention. A pair of plungers 43, 44 are shown passing through holes 41, 42 so as to be aligned with contactors 45, 46 of hook switch 16. The hook switch is shown schematically in FIG. 2 as being mechanically actuated by a bridge member 47 which itself is pressed downwardly by contactors 45 and 46. This is the construction of the standard telephone set and requires no further discussion here.

Plungers 43 and 44 include heads 48 and bias springs 49. The effect of these bias springs is to press the plungers upwardly and away from contactors 45 and 46. A stiffly flexible bridgewire or leaf spring 50 interconnects the heads of plungers 43 and 44 so that the plungers move in unison. A sleeve 51 fits over the bridgewire and is attached to a shaft 52 which extends from a pulsing solenoid 53. The solenoid itself is not spring-loaded. Instead, its shaft is biased upwardly by springs 49. Actuation of the pulsing solenoid by passage of current through leads 54 and 55 will cause the solenoid to draw shaft 52 downwardly in FIG. 2, thereby to depress the plungers 43 and 44 and contactors 45 and 46. By timing the pulse in leads 54 and 55, and also the constants of springs 49, it is possible to make this pulse of the correct duration to simulate a pulse supplied by the dial itself, and a dialing operation can be carried out. This pulser is adaptable to single-post hook switches by deleting one of the plungers. Alternatively a single plunger might be used with a bridge to strike two hook switch posts.

A second bridge 56 includes a pair fo spring guides 59, 60 that are aligned with a second set of guides **61, 61*a*. A pair of bias springs 62, 63 are respectively guided by guides 59, 60, and guides 61, 61*a*. Springs 62 and 63 bias the bridge downwardly so as to cause it to bear against sleeve 51 and depress the plungers 43 and 44 effectively to "hang up" the telephone. The downward force exerted by the weight of the bridge and bridgewires, together with the differential forces between springs 49 and 62, 63 will cause the device to be in the "hung up" position shown in FIG. 2 except when dial tone solenoid 64 is energized. Dial tone solenoid 64 is connected to bridge 56 by a shaft 65. Application of current through leads 66, 67 will cause the dial tone solenoid to be energized and draw bridge 56 upwardly and away from and out of contact with sleeve 51. This will enable springs 49 to move the plungers upwardly, thereby permitting contactors 45, 46 to rise and a dial tone to be obtained. Then actuation of pulsing solenoid 53 will cause intermittent downward pulsing movements of contactors 45, 46. Frame 40 includes a pair of legs 68 to space the bottom 69 of the frame from the top of base 13** so that the plungers will have room to operate.

Figure 4:
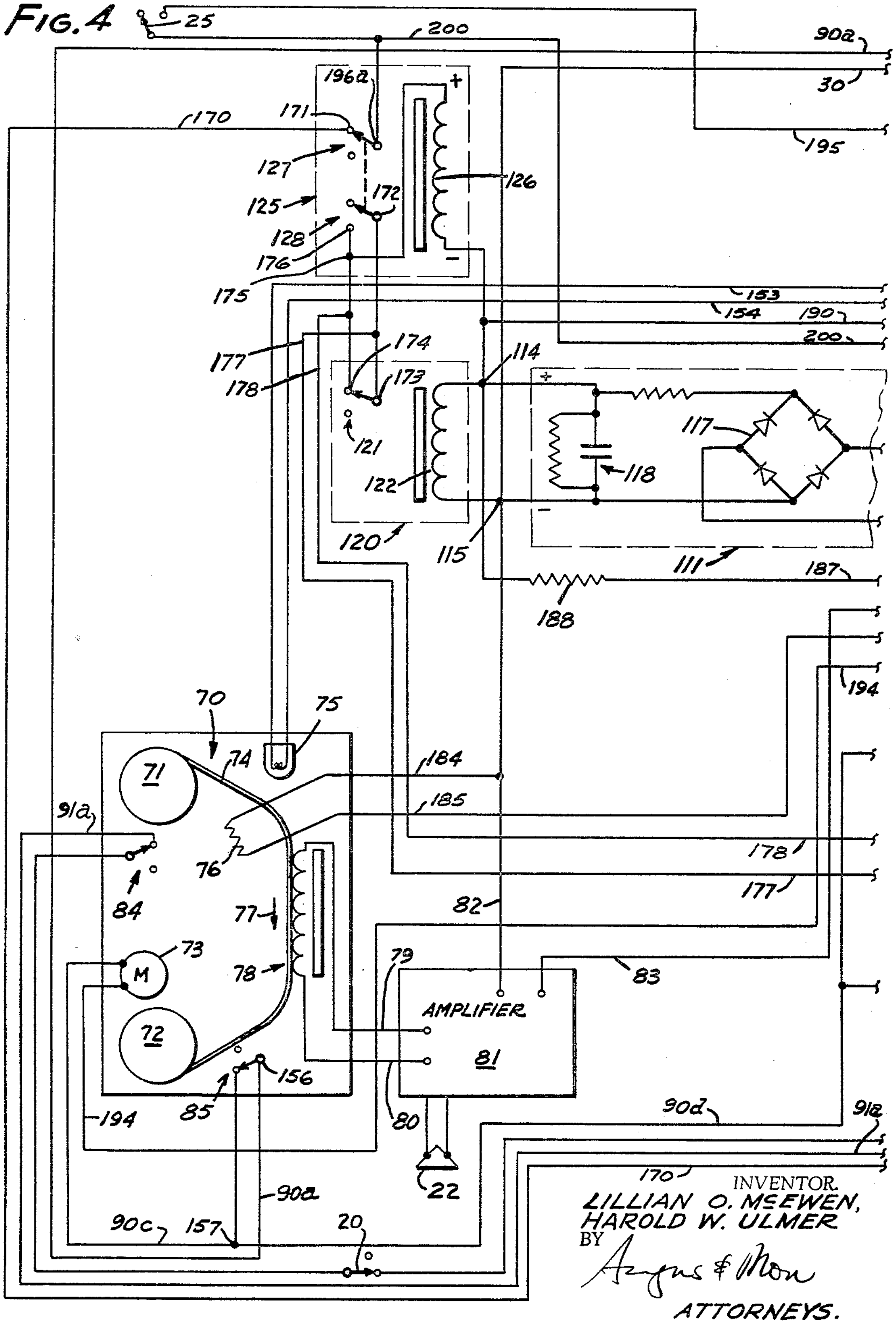
FIGS. 4 and 5 are circuit diagrams of a circuit adapted to be utilized with the device of FIGS. 1–3, the right-hand edge of FIG. 4 matching the left-hand edge of FIG. 5.
Figure 5:
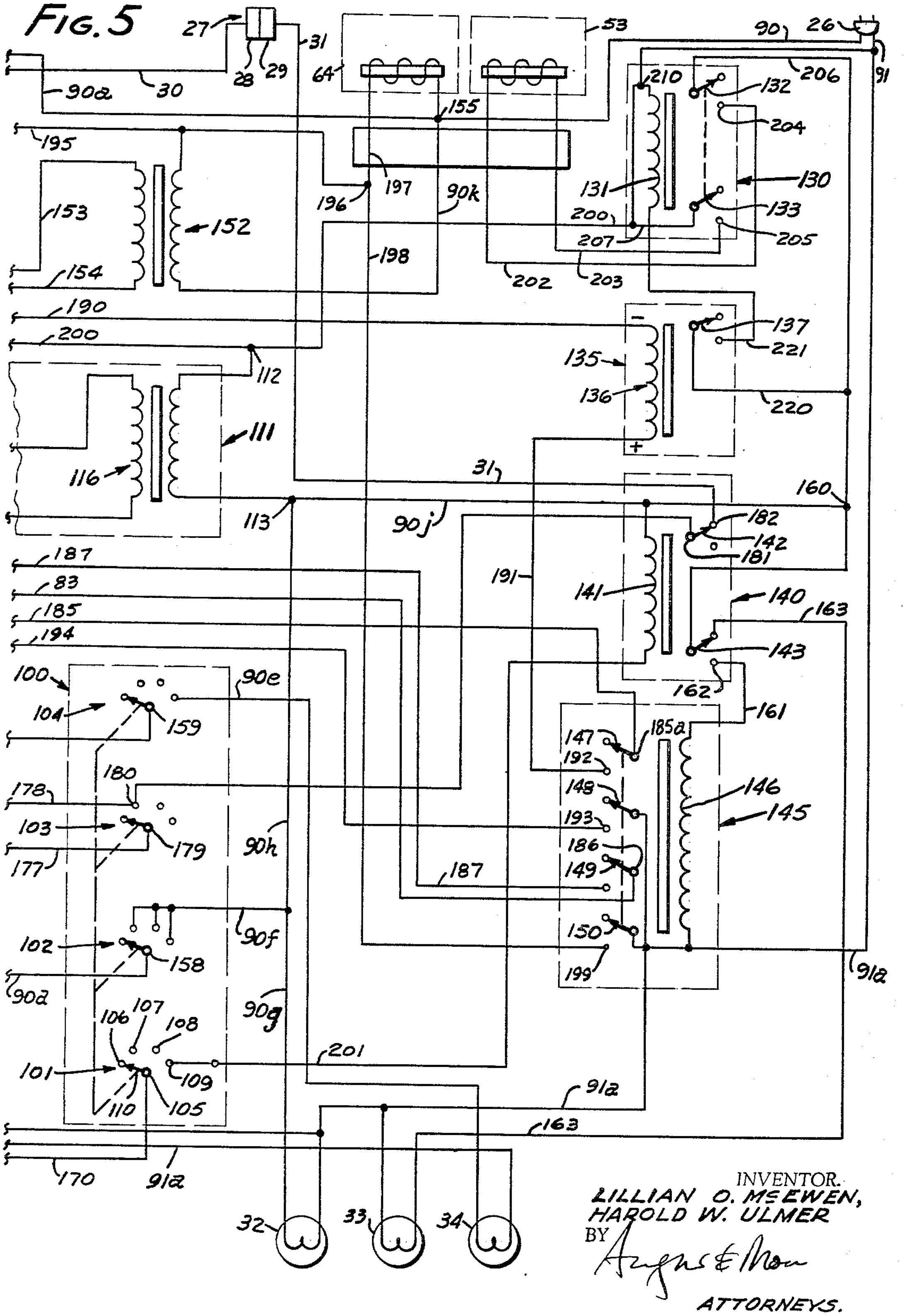

FIG. 4 illustrates the means whereby the dialing pulses and the spoken message are supplied. A tape transport 70 is shown schematically as containing a tape supply reel 71 and a windup reel 72 which are operated by motor 73. A tape 74 is shown progressing from one reel to another, the general path being indicated. It is to be understood that suitable drive capstans and guides will be provided. The path of the tape extends between a lamp 75 and a photo cell 76. The tape will at least over part of its length include a perforated opaque region where the perforations are spaced at definite intervals which, when the tape is linearly moved at a predetermined speed, provides pulses of light to the photo cell at intervals timed to correspond with proper dialing pulses. Therefore, over at least part of the tape, data is carried in a first form of notation, to wit, the passage or non-passage of light therethrough. Arrow 77 indicates the direction of path motion of the tape.

Beyond the photo cell, the tape passes by a pickup coil 78 which reads a magnetic pattern from another part of the tape which is a common signal utilized for recorded spoken messages. Therefore, along other portions of the tape, information will be carried in a second form of notation, to wit, magnetic bits of data corresponding to a spoken message. It will therefore be seen that some portions of the tape control circuitry are involved with the lamp and photo cell, while other portions of the tape supply a signal to the pickup coil. The importance of this arrangement is that the same tape can be utilized to provide dialing pulses in one part of the circuit, and also to provide a message in another part of the circuit. Different portions of the tape bear the different data, but they can be provided sequentially on the same reel. Further, a signal can be given by the opaque, punched portion of the tape which will "hang up" the phone, followed by the dialing of another number (or the redialing of the same number), followed by another spoken message.

Leads 79, 80 provide the input signal to an amplifier 81 that provides the spoken message to speaker 22. Power supply leads 82, 83 provide power to the amplifier. A first tape-resonsive switch 84 is adapted to be contacted (by means not shown) by the surface of the tape on the reel and indicates whether or not the tape is fully wound on reel 71 through lamp 34. The circuit is closed through this switch when the tape supply reel is fully loaded, and open when it is not. A second tape-responsive switch 85 operates as a shut-off device, and is an "end of the run" switch. It is adapted to be closed when the tape is not fully wound on reel 72. When the tape is fully wound on reel 72, at the end of the run, then the physical relationship of the switch and the tape on the reel opens switch 85 and stops motor 73. Switches 84 and 85 are shown at the start of the run, with the data-bearing portions of the tape on reel 71.

The device as illustrated is adapted to operate on 117 volts A.C., but may also operate on other supply lines by minor circuit or component modifications. Plug 26 connects to two power leads 90, 91. The circuit is made up of a group of switches and relays which will now be described. A master selector switch 100 is provided with four sectors 101, 102, 103 and 104. Each constitutes a rotary switch, the components of which are alike, and they are ganged together so as to move in unison. Sector 101 is typical. It includes a central terminal 105 and four switching terminals 106, 107, 108 and 109. These terminals are respective to the indicated switch conditions of "off," "reset," "check," and "operate." Each sector has a contactor 110 which selectively interconnects the central terminal to one of the switching terminals respective to the switch condition.

In the event that 117 volt A.C. power is impressed across leads 90 and 91, it is desirable to provide a D.C. supply 111. This supply has input terminals 112, 113 and output terminals 114, 115. The power supply includes a step-down transformer 116, a full-wave rectifier 117, and filter 118, the details of which are entirely conventional and require no extensive description here. Suffice it to say that 28 volt D.C. current is provided at output terminals 114 and 115.

The system additionally includes a time delay relay 120, having a time delay in switching over when actuated of about one second during which period of time the position of the relay switch remains unchanged. The time delay relay has a switch 121 shown in the unenergized or unactuated condition as are all other relays in the system as illustrated. On actuation, it will switch to the open condition. It is shown in the closed condition which is its normal unactuated setting. Relay 120 includes a coil 122 whose actuation is effective to change the setting of the switch, and the notation used in connection with this relay will be used also in connection with the other relays in the system.

An actuator relay 125 is provied which has a coil 126 and a pair of normally-closed switches 127, 128.

A jiggler power relay 130 includes a coil 131 and a pair of normally-open switches 132, 133. A pilot relay 135 includes a coil 136 and a single normally-open switch 137. A lock-out relay 140 includes a coil 141 and a pair of normally-closed switches 142, 143.

A system control relay 145 includes a coil 146 and four switches 147, 148, 149, 150. These switches are ganged together as are the switches in the other multiple switch relays.

A lamp supply 152 comprising a transformer is also provided in the circuit to provide a reduced voltage to lamp 75 from the secondary of the transformer through leads 153, 154.

The leads and their interconnections with the various switches and coils will now be described. Lead 90 forms one side of the power system. It extends to a junction 155 where it branches to form branch **90*a* which extends to the left through FIG. 4 and terminates at contact 156 of switch 85. This branch of the power circuit may be traced from the other terminal of switch 85 to junction 157, where branch 90*c* proceeds to one side of motor 73. From junction 157, another branch 90*d* may be traced to the central terminal 158 in sector 102 of master selector switch 100, and also to central terminal 159 of sector 104. It will thereby be seen that, provided switch 85 is closed, one side of the power circuit is applied to two sectors of the selector switch. Attending further to sector 104, it will be seen that in the "operate" position of the switch in this sector, a power branch 90*e* extends to one terminal of lamp 34. With reference to sector 102, it will be noted that in the reset, check and operate conditions, a circuit is completed to branch 90*f* which in turn branches into branch 90*g* which connects with one terminal of lamp 32, and with branch 90*h* which connects to input terminal 113 of the D.C. power supply. Branch 90*j* connects with branch 90*h* and with junction 160. From junction 160, power is made available to switches 132, 137 and 143 and relay 140 at one end of relay coil 141**.

Now returning to junction 155, lead 90 branches to form branch **90*k*** which connects to one terminal of the primary winding in the lamp supply transformer.

The other lead 91 of the power circuit branches to form branch **91*a* which connects with one terminal of coil 146 in the system control relay 145. The other terminal of system control relay is connected by lead 161 to normally-open terminal 162 of switch 143. The other switching terminal of switch 143 is connected by lead 163 to one terminal of lamp 33. Branch 91*a* is also connected to the central terminals of switches 148 and 150. Branch 91*a* continues to connect with the other terminals of lamps 32 and 33 and proceeds through switches 20 and 84 to the remaining terminal of lamp 34**.

The foregoing completes the description of the points of application and primary control of power. The remaining circuitry is internal and relates to the sequential control and actuation of the device.

A lead 170 interconnects terminal 171 of switch 127 with central terminal 105 of sector 101. Further in actuator relay 125, terminal 172 is connected to a terminal 173 of switch 121 in time delay relay 120, while the other terminal 174 of relay 120 is connected to terminal 175 of relay 125. It is also connected to terminal 176 of switch 128. Terminal 175 is also connected to one side of relay coil 126, the other side of which is connected to output terminal 114 of the D.C. power supply. Leads 177 and 178 are respectively connected across the terminals 172 and 176 as well as terminals 173 and 174. These leads proceed respectively to central switching terminal 179 in sector 103 and to switch terminal 180 in the same sector. Lead 177 terminates at terminal 179, while lead 178 continues to terminal 181 of switch 142. Normally-closed terminal 182 of switch 142 is connected to lead 31 which connects with plate 29 of the sensor. Following this same circuit, lead 30 extends to connect to output terminal 115 of the 28 volt D.C. power supply.

As will be seen from what is to follow, the circuit last described, based around switch 128 is a latching circuit effective in keeping lead 170 from supplying power from point 171 of switch 127 to lockout relay 140.

The photo cell circuit includes leads 184 and 185. Lead 184 and lead 82 are interconnected, and connect to power supply output terminal 115. Lead 185 proceeds to switching terminal **185*a* of switch 147. Following the circuit of switch 147, its normally-open terminal 192, is connected by lead 191 to one terminal of coil 136 of the pilot relay 135. Proceeding further from relay coil 136, lead 190 connects with terminal 114** of the 28 volt D.C. power supply.

A resistor 188 is incorporated in lead 187 and proceeds to the normally-open contact of switch 149. The arm of switch 149 proceeds through terminal 186 to lead 83, to provide the power circuit to amplifier 81. The other lead 82 from the amplifier proceeds to a junction with 184 and thence to the point 115 of the 28 volt D.C. power supply as noted above.

The normally-open terminal 193 of switch 148 is connected by lead 194 to motor 73, the other side of which is connected to branch **90*c* of the power circuit. The central switching terminal of switch 148 is connected to branch 91*a* of the power circuit. Lead 195 interconnects central switching terminal 196*a* of switch 127 to switch 25 and continues to junction 196. Lead 197 connects to one side of the dial tone solenoid, and lead 198, which also connects with junction 196, extends to normally-open terminal 199 of switch 150. The other side of switch 150 connects to branch 91*a* of the power circuit. Switching terminal 196*a* of switch 127 is connected by lead 200 to junctions 112 and 210 which are in turn connected to power lead 91. Lead 201 interconnects switch terminal 109 of sector 101 to one end of coil 141 in lockout relay 140. The other end of this coil is connected to lead 90*j***.

Leads 202 and 203 respectively connect to normally-open terminals 204, 205 of switches 132 and 133. The central switching terminal of switch 132 connects by lead 206 to junction 160. The central switching junction of switch 133 connects by lead 207 to lead 200 and thus to power circuit 91. Switches 132 and 133 therefore constitute power control switches for the jiggler solenoid 53. Leads 220, 221 connect junction 160 and one end of coil 131 through switch 137, so that actuation by relay 135, which closes switch 137, actuates relay 130, and thereby pilots the operation of the jiggler solenoid.

The operation of the device will now be described. The general scheme is that the device, after having last been used or when first set up, must be placed in a "reset" condition, after which the condition of the internal circuitry may be checked out, and also the condition of the sensor elements. After the device has been reset and checked, it is then set to operate where it may be left in place all night, or for whatever the standby period is. The device of course can initially be set in the "off" position, which results in deactuation of every circuit. This may readily be determined by reference to the condition in master selector switch 100 in the position illustrated. The illustrated condition is that of complete passivity with the master selector switch in "off" and all circuits disabled. Therefore, every relay and its associated switches are shown in the deactuated condition. Actuation of any relay will change the condition of the switch to the opposite of that which is shown.

When the device is set at "off," there are no connections beyond terminals 105, 158, 179 and 159 in the sectors. Because every power circuit goes through these sectors, then it follows that every circuit is disabled. Now assume that plug 26 is plugged into a source of 117 volt A.C. current, and the master selector switch is set to "reset." In this position, power will be applied to the input terminals 112 and 113 of the D.C. power circuit as follows: from lead 91 through junction 210 and lead 200 to terminal 112. From terminal 113, through branches **90*h*, 90*f*, through sector 102, branch 90*d* to junction 157, through switch 85 to branch 90*a*, and then to lead 90, thereby completing a power circuit. This power circuit would be interrupted, and the device would not properly function were the tape supply not completely wound on reel 71 so that switch 84 would be closed by virtue of the full condition of reel 72, to allow lamp 34 to show the equipment ready when switch 100 is turned to operate position. Switch 85 is provided so the device will turn itself off when tape take-up reel 72** is full and all dialing and message transmission has been completed.

Applying power to the D.C. supply applies power to terminals 114 and 115, and thus applies potential to one end of coil 126. The objective at this point is to actuate relay 125 which can be accomplished if the rest of the circuitry is complete. Because it takes time delay relay 120 one second to actuate and open its switch, there will during that second be a complete circuit through coil 126 through junction 175, switch 121, lead 178, to and through switch 142, returning through lead 31 and through sensor 27 which, if closed, permits current to flow through lead 30 and return to output terminal 115. Thus, during that one second, if the sensor is closed, then actuator relay 125 can be actuated which will switch over its switches. To switch 128 particular attention is directed, because this comprises a latch circuit as follows: junction 175 through switch 128 and then to lead 178 where the circuit through the sensor is the same. Therefore, even though the time delay relay 120 opens switch 174 after one second, the actuator relay has had time to become actuated and locked, and it will remain locked until something breaks that circuit. In this condition, the lamps 32 and 33 which relate to the "on-reset" and to "check" will be illuminated.

The master selector switch is then turned to the "check" position which allows the operator to learn if the sensor circuit or circuits is or are complete. If any is open, then the check light will go out when the switch is switched to this position. If light 33 remains lit when the switch is in the "check" position, it is indicative that the sensor circuit through elements 28 and 29 is closed, and the actuator relay will remain latched through its contacts as previously described. If the sensor had been open, it would have broken the latching circuit, and because the time delay relay switch 121 would still be open, it would not be possible to reestablish actuation of relay 125 until the circuit has been reestablished through the sensor and terminals 179 and 180 of section 103 of the master selector switch when returned to its "reset" position.

When the switch is switched into the "operate" position, the operate light 34 will come on if the tape supply reel 71 is full so that switch 84 is closed. This indicates that the tape recorder is full and ready to go, and that it has a full supply of tape to properly dial the telephone numbers and deliver the message. Also, in this same circuit, which includes branch **91*a* and lead 220, there is switch 20 which is closed when the pulser is off of its normal place of rest 19 on the base. It is assumed that no person would pick up the pulser and put it any place except in the proper location upon the telephone base. Therefore, this switch will be closed because there is no weight atop it, and the light will remain lit. In the "operate" condition on standby, it therefore follows that the sensor is closed and actuator relay 125 and time delay relay 122** are energized. None of the other relays are energized, but instead remain in their passive position.

At this time it might be desired to use the telephone without disturbing the condition of the alarm circuitry. This is the purpose of switch 25 which remains open while the telephone receiver is on the rest on base 18. Should it be picked up, then a circuit is made from power lead 91 through junction 210 and lead 200 through switch terminal **196*a* and lead 195 to junction 196 through the dial tone solenoid to junction 155 and thence to power lead 90. It will be seen that this actuates dial tone solenoid 64, thereby raising the bridge 56 and permitting springs 49 to raise plungers 43 and 44 so as to give a dial tone to the telephone. Then after the call is completed, the telephone may be returned to the rest on base 18 which will open switch 25, again disabling dial tone solenoid 64**. This operation will not have affected the rest of the circuitry.

Now assume that an event occurs which opens the circuit between leads 30 and 31. This will break the latching circuit which extends through terminal 180 on sector 103 and cause actuator relay 125 to lose its power. Then the circuit will be switched back so that actuator relay 125 will appear as it is illustrated in the "off" condition.

The result of this is to apply current to lockout relay 140 as follows: a circuit is made from power lead 91 through junction 210, lead 200, switch terminal **196*a* through switch 127, lead 170 through sector 101 to lead 201, and thence the one terminal of coil 141, thence through branches 90*j* and 90*h*, 90*f* through sector 102, thence through branch 90*d*, switch 85 and to branch 90*a*, returning to power lead 90. Actuation of lockout relay 140 switches over switch 143 so as to complete a circuit between power lead 91, branch 91*a*, through coil 146, lead 161, switch 143 to junction 160 and branch 90*j*, and thence to power lead 90 as just described in connection with the actuation of relay 140. This causes all switches of system control relay 45 to switch over, which will start the operation of the alarm. Furthermore, the actuation of relay 140 positively breaks any circuit through the coil of actuator relay 125** so that should the burglar reclose the circuit by closing the sensor, he could not possibly shut off the device.

Now the following events occur. The dial tone solenoid 64 will receive power through switch 150, the lamp power supply 152 receives power from the same point, thereby illuminating light 75. Motor 73 receives power through switch 193 and lead 194, and the transistor amplifier receives power, and the photo cell circuit is also completed through the circuitry of relay 145. Now the motor's operation draws the tape between the lamp and the photo cell so that pulses derived by intermittent passage of light beams are derived as signals across lead 184 and 185, the effect of which is to cause the completion of a circuit through coil 136 of pilot relay 135 for every pulse. This circuit may be traced as follows: the 28 volt D.C. power supply at point 115 connects by lead 184 to the photo cell 76, also one side of relay coil 136 of pilot relay 135 connects by lead 190 to terminal 114 which is the other side of the 28 volt D.C. power supply. The other side of relay coil 136 is connected to the other side of photo cell 76 through lead 191 and switch 147 of system control relay 145, and through lead 185 thereby making the circuit complete. The combination of the 28 volt power supply, relay 135 with its coil 136, and photo cell 76, is such that the relay will not operate when the photo cell 76 is in the dark condition. However, when the photo cell 76 sees lamp 75 through a punched spot in tape 74, sufficient current will flow in the circuitry through photo cell 76 to actuate pilot relay 135, thereby actuating jiggler power relay 130 and also the hook switch solenoid 53.

Each time that coil 136 is energized, switch 137 is closed, thereby receiving power from branch **90*j* and passing it to coil 131 of jiggler power relay 130, thereby energizing the same. This changes the condition of switches 132 and 133, energizing the jiggler solenoid. After the correct number of pulses to dial the number, the tape continues to move and the pickup head 78 then reproduces to speaker 22** a voice message which is picked up by the telephone microphone. At the end of the first spoken message, a series of closely-spaced holes will be provided in the tape which give a very rapid series of pulses which will be such as to essentially hold the jiggler solenoid actuated continuously so as to give the equivalent of a "hang up" signal to the telephone. Right after that, then again a number of pulses will be supplied to dial the same or a different phone number followed by other voice messages. Ordinarily up to about three voice messages and dialing signals will be provided.

At the end of this sequence, whatever the number of telephone numbers are called, the tape from reel 71 will have wound up sufficiently that the condition of switches 84 and 85 will be changed. When switch 85 is opened, then motor 73 will stop, all power is removed from all circuitry, and rewinding is necessary prior to further use of the device. The machine cannot be turned on again until the tape is rewound onto reel 71, because it will be necessary to shift switch 84 back to its other position to allow lamp 34 to indicate and show that the full tape reel is ready to perform all dialing functions. Then to reset the machine and use it again, the aforementioned sequence is repeated, including switching switch 100 back to first reset, then check, then operate position.

The time delay relay 120 assures that momentary breaks in the power supply will not affect the circuit itself, because it reacts slowly enough that most transient effects will be masked out by this switch.

This device therefore comprises a foolproof technique whereby a simple and universal telephone circuit can be used for a voice-type burglar or fire alarm and in which the telephone may be used normally without resetting the circuit. It is foolproof against resetting by the burglar and may be placed in an armored case or a distant region where the burglar will be unlikely to get near it to interfere with its function.

This device is also adapted for use on different power supplies. For example, were plug 26 to be plugged into a D.C. power supply, then the lamp supply transformer might be replaced by a dropping resistor to secure the proper voltage for the lamp, and by obvious and simple modifications, the D.C. supply 111 can be eliminated. It will also be recognized that jiggler power relay 130 might be replaced by a single pilot relay 135 should a heavier pilot relay be utilized. However, for simplicity in manufacture for a number of different applications, it is found expedient to manufacture a single circuit, including a pilot relay, and then adapt the other relays to fit the individual needs.

This invention is not to be limited by the embodiment shown in the drawings and described in the description which is given by way of illustration and not of limitation, but only in accordance with the scope of the appended claims.

What is claimed is:

1. An alarm device adapted to be used in combination with a telephone of the class which includes a base, a microphone, and a hook switch which is adapted to produce line pulses of the dialing type, said alarm device comprising: a hook switch pulser adapted to bear against and actuate the hook switch to produce dialing pulses, said hook switch pulser comprising a frame adapted to rest on the telephone base and overhang the hook switch, a plunger having an axis of reciprocal movement which in one axial position moves the hook switch to a first condition, and in a second axial position moves the hook switch to a second condition, motion between the two conditions supplying a line pulse of a dialing type, and prolonged residence in said two conditions causing the hook switch to open or close the telephone circuit, respectively, and in which the pulse-data responsive means includes a pulsing solenoid adapted to shift the plunger to one of said positions, and a first spring adapted to shift the plunger to the other of said positions, the solenoid being responsive to data carried by said pulse-data bearing means; pulser actuating means; pulse-data bearing means bearing a code relating to a number to be dialed; data-responsive means adapted to actuate the pulser actuating means thereby to pulse the hook switch; message-data bearing means; message reproducing means responsive to the message-data bearing means and including a speaker adapted to supply a reproduced message to the telephone microphone after the pulser-actuating means has actuated the hook switch and dialed a respective telephone number; and a sensor adapted to be placed in a location whose condition is to be monitored by the alarm device, said sensor being so interconnected to the data-responsive means and to the message-reproducing means as to initiate their operation, thereby to dial a number and then supply a recorded message to the telephone microphone; and a dialing tone solenoid and a second spring, the first and second springs being opposed through a separable bridge and the second spring normally overcoming the first spring to move the plunger to "hang up" the telephone circuit, the dial tone solenoid being adapted to retract the bridge, thereby to leave the plunger under the sole control of the pulsing solenoid and the first spring.

2. An alarm device adapted to be used in combination with a telephone of the class which includes a base, a microphone, and a hook switch which is adapted to produce line pulses of the dialing type, said alarm device comprising: a hook switch pulser adapted to bear against and actuate the hook switch to produce dialing pulses; pulser actuating means comprising a pair of solenoids, one of said solenoids constituting a dial tone solenoid adapted to enable a dial tone to be obtained, and the other constituting a jiggler solenoid adapted to pulse the hook switch and thereby generate a dialing pulse, and in which a switch is provided which is closed when the handset is picked up so as to close a circuit through the dial tone solenoid to permit a normal telephone call to be made independently of the alarm system; pulse-data bearing means bearing a code relating to a number to be dialed; data-responsive means adapted to actuate the pulser actuating means thereby to pulse the hook switch; message-data bearing means; message reproducing means responsive to the message-data bearing means and including a speaker adapted to supply a reproduced message to the telephone microphone after the pulser-actuating means has actuated the hook switch and dialed a respective telephone number; and a sensor adapted to be placed in a location whose condition is to be monitored by the alarm device, said sensor being so interconnected to the data-responsive means and to the message-reproducing means as to initiate their operation, thereby to dial a number and then supply a recorded message to the telephone microphone.

3. An alarm device adapted to be used in combination with a telephone of the class which includes a base, a microphone, and a hook switch which is adapted to produce line pulses of the dialing type, said alarm device comprising: a hook switch pulser adapted to bear against and actuate the hook switch to produce dialing pulses comprising a frame adapted to rest on the telephone base and overhang the hook switch, a plunger having an axis of reciprocal movement which in one axial position moves the hook switch to a first condition, and in a second axial position moves the hook switch to a second condition, motion between the two conditions supplying a line pulse of a dialing type, and prolonged residence in said two conditions causing the hook switch to open or close the telephone circuit, respectively; pulser actuating means; pulse-data bearing means bearing a code relating to a number to be dialed; data-responsive means adapted to actuate the pulser actuating means thereby to pulse the hook switch comprising a lamp and a photo cell, said lamp and photo cell providing a pulse in response to data comprising a transparent region in the pulse-data bearing means and a pulsing solenoid adapted to shift the plunger to one of said positions, and a first spring adapted to shift the plunger to the other of said positions, the solenoid being responsive to data carried by said pulse-data bearing means; message-data bearing means; message reproducing means responsive to the message data bearing means and including a speaker adapted to supply a reproduced message to the telephone microphone after the pulser-actuating means has actuated the hook switch and dialed a respective telephone number, the message-reproducing means comprising a tape playback device including pickup head responsive to magnetic signals; a sensor adapted to be placed in a location whose condition is to be monitored by the alarm device, said sensor being so interconnected to the data-responsive means and to the message-reproducing means as to initiate their operation, thereby to dial a number and then supply a recorded message to the telephone microphone; and a dialing tone solenoid and a second spring, the first and second springs being opposed through a separable bridge and the second spring normally overcoming the first spring to move the plunger to "hang up" the telephone circuit, the dial tone solenoid being adapted to retract the bridge, thereby to leave the plunger under the sole control of the pulsing solenoid and the first spring.

4. An alarm device according to claim 3 in which the pulse-data bearing means and the message-data bearing means comprise an elongated member, and in which a transport means moves said elongated member at an established linear rate of speed, and in which the data-responsive means and the message-reproducing means comprise devices responsive to the data carried by the elongated member.

5. An alarm device according to claim 4 in which the sensor is included in a sensor circuit, said sensor circuit including an actuator relay having a latch switch, a latch circuit through said latch switch being interruptible by changing the condition of said sensor, and thereby changing the condition of said actuator relay, and in which the data-responsive means, and message-reproducing means are under control of a system control relay, the system control relay being actuated to start the data-responsive means and message-reproducing means in operation when the condition of the actuating relay is changed by the sensor.

6. An alarm device according to claim 5 in which a time-delayed off-on switch is connected in the latch circuit, whereby changes in power conditions to the actuator relay are delayed in effect for a predetermined period.

7. An alarm device according to claim 6 in which a lockout relay is provided which is sensitive to changes in condition of the actuator relay which lockout relay includes a switch in circuit with the system control relay, whereby after a sensor-caused change in condition of the actuator relay, the lockout relay prevents reestablishment of rest conditions in the alarm even if the rest condition of the sensor is reset.

References Cited

UNITED STATES PATENTS

| | | | |
|---|---|---|---|
| 2,827,515 | 3/1958 | Zuber | 179—5 |
| 3,095,478 | 6/1963 | Adams | 179—5 |
| 3,109,894 | 11/1963 | Humphreys | 179—5 |
| 3,131,260 | 4/1964 | Evans | 179—5 |

ROBERT L. GRIFFIN, *Primary Examiner.*

JOHN W. CALDWELL, *Examiner.*

J. T. STRATMAN, *Assistant Examiner.*